United States Patent
Menzel

(10) Patent No.: US 8,280,789 B2
(45) Date of Patent: Oct. 2, 2012

(54) METHOD OF BILLING A CLIENT FOR USING A COMPUTERIZED NUMERICAL CONTROL MACHINE

(75) Inventor: Thomas Menzel, Bubenreuth (DE)

(73) Assignee: Siemens Aktiengesellschaft, München (DE)

( * ) Notice: Subject to any disclaimer, the term of this patent is extended or adjusted under 35 U.S.C. 154(b) by 489 days.

(21) Appl. No.: 11/706,493

(22) Filed: Feb. 15, 2007

(65) Prior Publication Data

US 2008/0201263 A1      Aug. 21, 2008

(51) Int. Cl.
G07F 19/00      (2006.01)
H04M 15/00     (2006.01)

(52) U.S. Cl. .......................................... 705/34; 700/189

(58) Field of Classification Search ............... 118/708; 175/45, 48, 61, 73; 705/1, 32, 40; 700/98, 700/118, 182, 197
See application file for complete search history.

(56) References Cited

U.S. PATENT DOCUMENTS

| | | | |
|---|---|---|---|
| 5,815,401 A | * | 9/1998 | Otsuki et al. ................ 700/189 |
| RE37,822 E | * | 8/2002 | Anthonyson ..................... 701/1 |
| 6,701,200 B1 | * | 3/2004 | Lukis et al. ..................... 700/98 |
| 7,747,300 B1 | * | 6/2010 | de Barros ....................... 455/703 |
| 2002/0143716 A1 | * | 10/2002 | Byrne et al. .................... 705/412 |

FOREIGN PATENT DOCUMENTS

| | | |
|---|---|---|
| JP | 08123868 A | 5/1996 |
| WO | WO 00/19287 A1 | 4/2000 |
| WO | WO 0019287 A1 * | 4/2000 |
| WO | WO 03/062769 A1 | 7/2003 |

OTHER PUBLICATIONS

S.P. Lal, G.C. Onwubolu, Three tiered web-based manufacturing system—Part 1: System development, Robotics and Computer-Integrated Manufacturing, vol. 23, Issue 1, Feb. 2007, pp. 138-151, ISSN 0736-5845, 10.1016/j.rcim.2005.12.001. (http://www.sciencedirect.com/science/article/pii/S0736584506000056).*

* cited by examiner

Primary Examiner — Scott Zare
Assistant Examiner — Rokib Masud

(57) ABSTRACT

There is described an efficient and simple method of billing a client for using a computerized numerical control machine. The invoice amount to be billed is based on at least one trajectory of at least one axis during operation, on a volume of a stock removed from a work piece during operation, and on a processing time information related to working on the work piece. One concept of the method therefore is a pay-per-use concept relating the added value created by the computerized numerical control machine to the invoice amount.

5 Claims, 1 Drawing Sheet

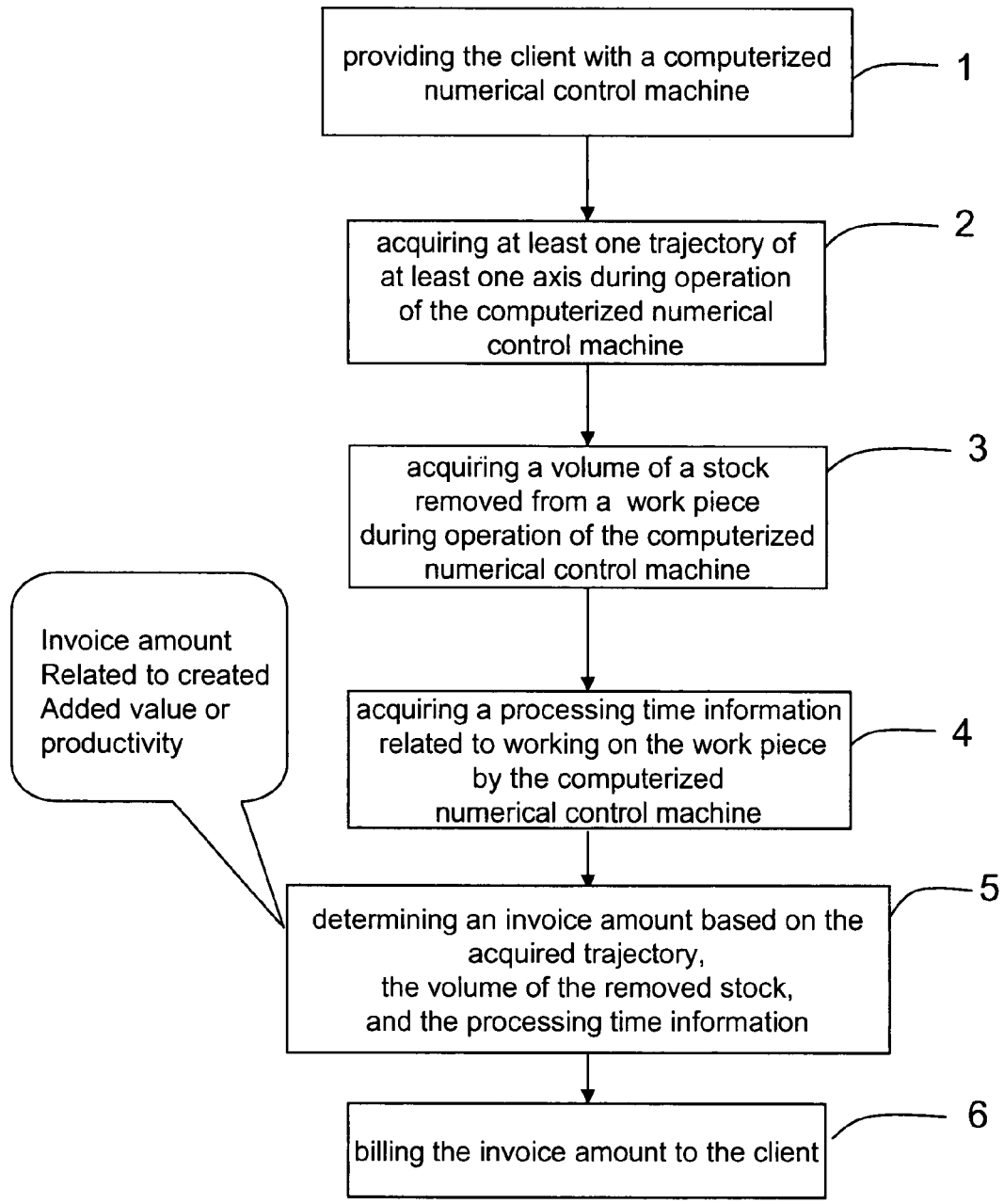

METHOD OF BILLING A CLIENT FOR USING A COMPUTERIZED NUMERICAL CONTROL MACHINE

FIELD OF THE INVENTION

The present invention relates to a method of billing a client for using a computerized numerical control machine.

BACKGROUND OF THE INVENTION

For many clients, purchasing sophisticated technical equipment including computerized numerical control machines such as CNC machines, production machinery, industrial plants, turbines, generators, passenger trains, vehicles, home entertainment devices and many more, an important aspect of their purchase decision is the initial investment necessary for acquiring such equipment. Especially complex and sophisticated computerized equipment tends to be very, costly so that some clients are reluctant to purchase because of the necessary high initial investment.

SUMMARY OF THE INVENTION

Even high initial investment can be worthwhile if the projected return-on-investment is high enough. But still the initial investment has to be made by the client, if necessary by third party financing which is not always manageable.

It is therefore an object of the invention to provide a flexible billing method.

One concept of the present invention is to provide a pay-per-use concept relating an added value or productivity created by the computerized numerical control machine to an invoice amount to be billed to the customer. Such pay-per-use concept makes it easier for the client to acquire the computerized numerical control machine as the machine is paid for according to the value it creates during operation and not according to a fixed purchase price or a fixed leasing rate. So even if the invoice amounts are high, it will be no problem for the client to pay because of the also high added value or productivity created by the machine. It is also thinkable that the machine provider provides the computerized numerical control machine to the client solely on the basis of such pay-per-use concept without requiring initial investment by the client.

Acquiring at least one trajectory of at least one axis during operation of the computerized numerical control machine, acquiring a volume of a stock removed from a work piece during operation of the computerized numerical control machine, and acquiring a processing time information related to working on the work piece by the computerized numerical control machine are all indicators of the added value the machine creates when processing the work piece. Pay-per-use in connection with the present invention therefore means not such taking into consideration a usage time. The stock removed includes material which is being removed from the work piece when working on the work piece using a tool (e.g. milling) thus shaping the work piece according to a desired shape.

Further aspects of the invention include differentiating between a primary and a secondary operating time when determining the invoice amount as the latter usually is less costly.

Other aspects of the invention relate to transmitting and billing the invoice amount to the client, wherein a telephone service or the internet may be used.

BRIEF DESCRIPTION OF THE DRAWING

The above-mentioned and other concepts of the present invention will now be addressed with reference to the drawing of a preferred embodiment of the present invention. The shown embodiment is intended to illustrate, but not to limit the invention. The drawing contains the following figure:

FIG. 1 is a flowchart of an exemplary process of the present invention showing an exemplary series of steps of billing a client for using a computerized numerical control machine.

DETAILED DESCRIPTION OF THE PREFERRED EMBODIMENT

Overview

The disclosed invention advantageously employs one or more base concepts. It basically provides an efficient and simple billing method based on an added-value or productivity created by the computerized numerical control machine. This may include omitting an initial investment by the client, as the pay-per-use concept underlying the invention shall be based strictly on added-value or productivity criteria. In other words, not the financial value of the machine but the value arising from processing work pieces on the machine forms the basis for reimbursing the machine provider.

This may lead to a win-win situation in many cases by sharing the risks as it relieves the client from a heavy initial investment and a continuing possibly overprized due. It also secures an equitable return-on-invest for the machine provider as the invoice amount billed to the client is related to the "success" (added-value, productivity) of the work pieces processed by the machine.

By contrast, known pay-per-use methods merely rely on usage time or used functions regardless if a profit originating from added-value or productivity has been earned.

Added-value is inter alia indirectly indicated by the at least one trajectory of the at least one axis of the machine during its operation. Computerized numerical control machines usually include a number of controllable axes which are moved according to more or less complex moving patterns to process the work piece as required. The trajectory of the at least one axis therefore is a measure for the degree of difficulty involved in processing the work piece. The more difficult the processing, the more valuable the processed work piece. The processed work piece thus includes an added-value compared to the raw work piece.

Another aspect which may be additionally or alternatively included when determining the invoice amount is a productivity of the computerized numerical control machine. Data indicating such productivity are usually available in a memory of the machine during operation and may include operating time, down time, operation during an (expensive) primary processing time, operation during a (less expensive) secondary processing time and processing time for at least one processing step.

The determined invoice amount is preferably transmitted to a billing processor assigned to the client or to the machine provider; transmission can be done e.g. over a telephone line, over the internet or over a radio signal.

Billing itself can include using a telephone line service charging the client for the invoice amount and crediting the machine provider via a telephone bill.

Alternatively or in addition, the invoice amount can be deductive from a pre-paid credit account held by the client.

The embodiment to be described in more detail in the following can be applied to billing clients operating all kinds of facilities such as industrial plants, hotels, production machinery, turbines, generators, passenger trains, vehicles, home entertainment devices and shall not be limited to any special purpose.

FIG. 1 depicts a flowchart of a process of the present invention showing a series of steps of billing a client for using a computerized numerical control machine.

Step 1 involves providing the client with the computerized numerical control machine by a machine provider. The machine provider may be the manufacturer of the computerized numerical control machine or he may himself have purchased or leased the machine.

Step 2 depicts acquiring at least one trajectory of at least one axis during operation of the computerized numerical control machine. As previously stated, added-value is inter alia indirectly indicated by the at least one trajectory of the at least one axis of the machine during its operation.

In Step 3, a volume of a stock removed from a work piece during operation of the computerized numerical control machine is acquired. In typical machine tool applications, a work piece is processed by removing stock to achieve a target shape and target size of the work piece. The amount of removed stock is again an indirect measure for a complexity of the processed work piece and therefore an indirect (added) value indicator.

Step 4 depicts acquiring a processing time information related to working on the work piece by the computerized numerical control machine. The processing time information can e.g. be related to operating the machine during a high demand and therefore costly primary processing time (e.g. day shift) or during a low demand and therefore less costly secondary processing time (e.g. night shift). It furthermore may relate to a processing time necessary for executing at least one processing step on the work piece.

Step 5 and 6 provide determining an invoice amount based on the acquired trajectory, the volume of the removed stock, and the processing time information, and (finally) billing the invoice amount to the client In addition to the embodiments of the aspects of the present invention described above, those of skill in the art will be able to arrive at a variety of other arrangements and steps which, if not explicitly described in this document, nevertheless embody the principles of the invention and fall within the scope of the appended claims.

For example, the ordering of method steps is not necessarily fixed, but may be capable of being modified without departing from the scope and spirit of the present invention.

What is claimed is:

1. A method of operating computerized numerical control and billing a client for the computerized numerical control machine based on a productivity indicator solely related to added value of the computerized numerical control machine, comprising:

operating a computerized numerical control machine for processing a work piece, wherein the machine creates an added value for the client based on productivity of the machine during operation on the work piece, wherein operating the computerized numerical control machine comprises removing a volume of a stock from the work piece during operation of the computerized numerical control machine to shape the work piece according to a desired shape based on a trajectory of at least one axis of the numerical control machine during a time shift;

during operation of the computerized numerical control machine, acquiring data from a memory of the numerical control machine, the data comprising elements as indicators of the added value of the computerized numerical control machine based on a combination of complexity of productivity factors consisting of:

(a) the trajectory of at least one axis during operation of the computerized numerical control machine when processing the work piece, wherein a complex pattern for the trajectory indicates a more difficult processing of the work piece and thus indicates the added value during operation, (b) the volume of a stock removed from the work piece during operation of the computerized numerical control machine, wherein the volume of stock removed indicates a complexity of processing the work piece and thus indicates the added value during operation; and (c) a processing time shift information based on the time shift when working on the work piece by the computerized numerical control machine, wherein the processing time information comprises either working on the work piece either during a high demand time shift indicating more costly processing time or a low demand time shift indicating a less costly processing time and thus indicates the added value during operation;

wherein data based on usage of the computerized numerical control machine itself is excluded as an element indicating added value;

determining an invoice amount for the computerized numerical control machine itself and not for the work piece wherein the invoice for the computerized numerical control machine is based solely on the acquired elements as indicators of the added value of the machine derived from the productivity of the computerized numerical control machine indicated by the (a) acquired trajectory, the (b) volume of the removed stock, and the (c) processing time information, wherein the invoice amount is based on productivity and not based on the financial value of the machine itself nor based on the extent to which the machine was used; and transmitting the invoice amount for the machine to the client via a communication link comprising a telephone line, an intranet or via the internet to allow the client to pay for the computerized numerical control machine according to the added value the computerized numerical control machine creates during operation based on the acquired elements as indicators of the added value as indicated on the invoice rather than a fixed purchase price for the computerized numerical control machine requiring an initial investment by the client.

2. The method according to claim 1, wherein billing the invoice amount to the client includes transmitting the invoice amount to a billing processor located at the client side or at the computerized numerical control machine provider side.

3. The method according to claim 1, further comprising associating fees for the invoice amount to a telephone line, wherein the fees are charged to the customer's telephone line and credited to the provider of the computerized numerical control machine's telephone line.

4. The method according to claim 1, further comprising deducting the invoice amount from a pre-paid credit account owned by the client.

5. The method according to claim 1, wherein determining the invoice amount is further based on a market value of the computerized numerical control machine.

* * * * *